F. C. KNEELAND.
Horse Rake.

No. 23,091. Patented March 1, 1859.

Witnesses
Robert Freeman
Luzerne Frost

Inventor
F. C. Kneeland

UNITED STATES PATENT OFFICE.

F. C. KNEELAND, OF HARTFORD, WISCONSIN.

IMPROVEMENT IN HORSE-RAKES.

Specification forming part of Letters Patent No. 23,091, dated March 1, 1859.

*To all whom it may concern:*

Be it known that I, F. C. KNEELAND, of Hartford, in the county of Washington and State of Wisconsin, have invented a new and Improved Horse-Rake; and I do hereby declare that the following is a full, clear, and exact description of the same, reference being had to the annexed drawings, making part of this specification, in which—

Figure 1:
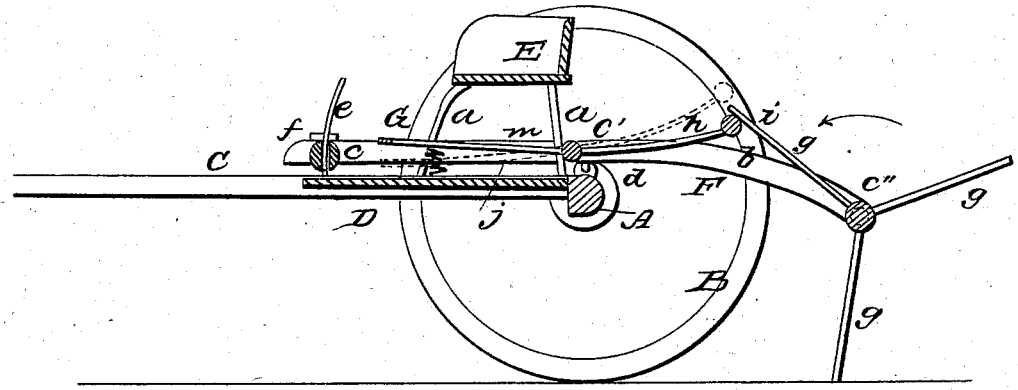
Figure 2:
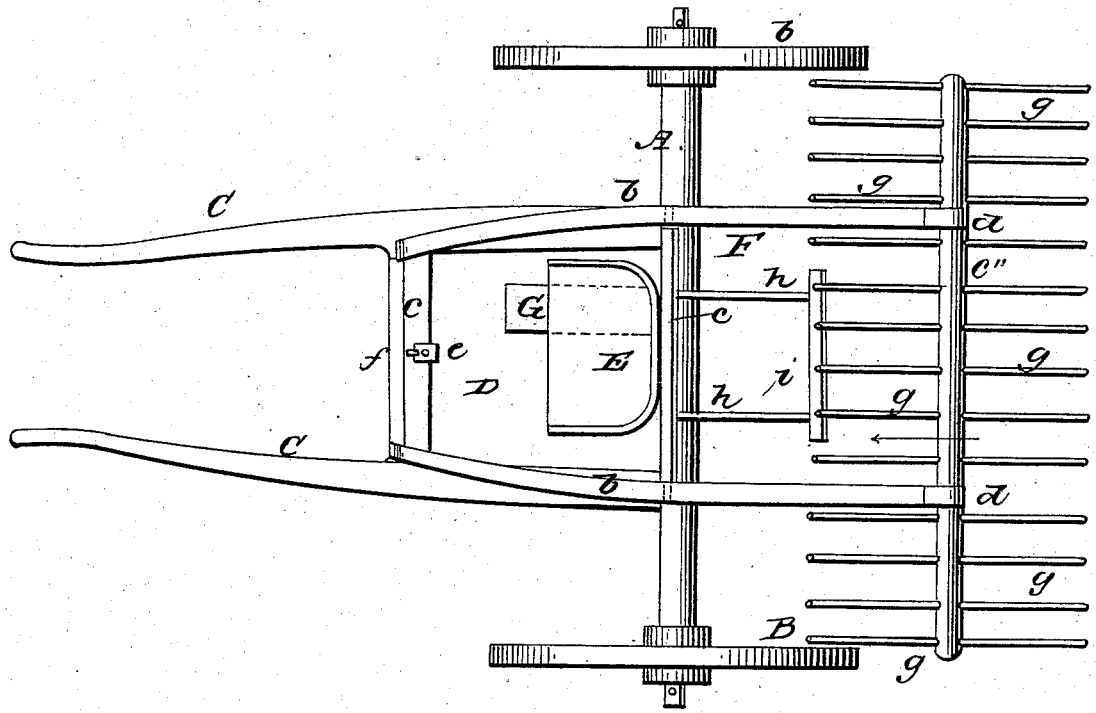

Figure 1 is a side sectional view of my invention. Fig. 2 is a plan or top view of the same.

Similar letters of reference indicate corresponding parts in the two figures.

To enable others skilled in the art to fully understand and construct my invention, I will proceed to describe it.

A represents an axle; B B, traction-wheels placed loosely thereon.

C C are thills attached to the axle, and D is a platform placed between the thills, at their back parts. On the platform D the driver's seat E is placed, it being supported at a suitable height by rods $a$.

F is a frame, which is formed of two bars, $b$ $b$, connected by a transverse piece, $c$, and two shafts, $c'$ $c''$. This frame is attached at each side, by joints $d$, to the axle A, so that it may be tilted or adjusted thereon, the joints $d$ being the fulcra of the frame. This frame is kept at any desired degree of inclination within the scope or range of its movement by means of a curved bar, $e$, which is attached to the front part of the platform, and passes through a mortise in the transverse bar $c$, the bar $e$ being perforated to receive a pin, $f$.

To the back part of the frame F the shaft $c''$ is attached by straps $d$ $d$, which serve as bearings, the shaft being allowed to turn freely in said bearings.

To the shaft $c''$ two or more series or rows of radial teeth, $g$, are attached. In Fig. 1 three rows of teeth are shown; but two rows may be used, if desired. The teeth may be formed of metal rods, or of a hard elastic wood.

To the shaft $c'$, which is also allowed to turn or work freely in the frame F, two rods, $h$ $h$, are attached, said rods being connected at their outer ends by a transverse bar, $i$, and projecting from the back side of the shaft $c'$.

To the front side of the shaft $c'$ a treadle, G, is attached, said treadle projecting in front of the driver's seat E, to receive the foot of the driver, when desired. Underneath the treadle G a spiral spring, $j$, is placed, said spring having a tendency to keep the front part of the treadle G elevated and the transverse bar $i$ within the path of the rotation of the teeth $g$.

The operation is as follows: As the machine is drawn along the grass or grain is gathered by the row of teeth $g$, that are in contact with or approach the ground, said row of teeth being kept in proper position in consequence of the ends of a portion of the front row of teeth above it bearing against the bar $i$. This will be clearly understood by referring to Fig. 1. When a proper amount of hay or grass is collected by the teeth which are at work the driver depresses the treadle G, and thereby throws up the bar $i$ free from the foremost upper row of teeth, $g$, and the rake will rotate one-third of a revolution in the direction indicated by arrow 1, the adjoining back row of teeth catching against the bar $i$. The grass or grain gathered by the rows of teeth is discharged at every rotating movement of the rake, and the teeth $g$ may be adjusted, as desired, relatively with the surface of the ground by adjusting the frame F.

This is a very simple and efficient device for the purpose intended. It may be constructed at a very reasonable cost, and the parts being very few and so simply arranged the device will not be liable to get out of repair, and, when necessary, can be very readily repaired.

Having described my invention, I claim as new and desire to secure by Letters Patent—

The arrangement and combination of the shaft $c'$, pivoted within the frame F, and provided with the treadle G, arms $h$, and bar $i$, with the frame F, when the latter is pivoted to the axle A, all as and for the purpose herein shown and described.

F. C. KNEELAND.

Witnesses:
LUZERNE FROST,
ROBERT FREEMAN.